(12) United States Patent
Wu et al.

(10) Patent No.: US 9,084,027 B2
(45) Date of Patent: Jul. 14, 2015

(54) INTERNET PROTOCOL TELEVISION SYSTEM AND IMPLEMENTATION METHOD THEREOF

(75) Inventors: Jianning Wu, Shenzhen (CN); Zhenzhong Liao, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 507 days.

(21) Appl. No.: 13/522,821

(22) PCT Filed: Jun. 4, 2010

(86) PCT No.: PCT/CN2010/073584
§ 371 (c)(1),
(2), (4) Date: Jul. 18, 2012

(87) PCT Pub. No.: WO2011/088651
PCT Pub. Date: Jul. 28, 2011

(65) Prior Publication Data
US 2012/0304227 A1     Nov. 29, 2012

(30) Foreign Application Priority Data

Jan. 21, 2010 (CN) .......................... 2010 1 0001085

(51) Int. Cl.
*H04N 21/258* (2011.01)
*H04N 21/482* (2011.01)
*H04N 21/485* (2011.01)
(Continued)

(52) U.S. Cl.
CPC ........... *H04N 21/6131* (2013.01); *H04H 60/90* (2013.01); *H04N 21/4104* (2013.01); *H04N 21/4113* (2013.01); *H04N 21/25816* (2013.01); *H04N 21/482* (2013.01); *H04N 21/485* (2013.01)

(58) Field of Classification Search
None
See application file for complete search history.

(56) References Cited

U.S. PATENT DOCUMENTS

| 7,647,612 B1 * | 1/2010 | Stark ............................... 725/80 |
| 2010/0077443 A1 * | 3/2010 | Wang ............................ 725/153 |

(Continued)

FOREIGN PATENT DOCUMENTS

| CN | 1893638 A | 1/2007 |
| CN | 101217616 A | 7/2008 |

(Continued)

OTHER PUBLICATIONS

"Compass 597 USB modem-User Guide"; 2130972 Rev 1.0 Apr. 8, See the whole document.

(Continued)

*Primary Examiner* — Nathan Flynn
*Assistant Examiner* — Omar S Parra
(74) *Attorney, Agent, or Firm* — Ling Wu; Stephen Yang; Ling and Yang Intellectual Property

(57) ABSTRACT

An Internet Protocol Television (IPTV) system and an implementation method thereof are disclosed. The method includes: installing a wireless data card in a television Set Top Box (STB) device through a personal computer (PC), establishing a connection with the STB device, and starting the wireless data card to wirelessly access to the IPTV network; accessing to the IPTV network resources through the PC or the STB device, implementing the IPTV service. This solution realizes that the IPTV user terminal device can access to the network wirelessly so that the IPTV terminal device have mobility in space, thus extending the application scenarios of the IPTV system.

8 Claims, 3 Drawing Sheets

(51) Int. Cl.
*H04N 21/61* (2011.01)
*H04N 21/41* (2011.01)
*H04H 60/90* (2008.01)

(56) References Cited

U.S. PATENT DOCUMENTS

2011/0004549 A1* 1/2011 Gray et al. .................. 705/40
2011/0246567 A1* 10/2011 Cedervall et al. ............ 709/203

FOREIGN PATENT DOCUMENTS

| JP | H0624090 A | 2/1994 |
| JP | 2009246498 A | 10/2009 |
| WO | 2008002372 A1 | 1/2008 |

OTHER PUBLICATIONS

"Dreambox DM 8000 HD PVR DVD"; Jun. 2, 2009, XP002606144A; http://www.dream-multimedia-tv.de/download/instruction_manual_dm8000_06-02-2009; [retrieved on Oct. 20, 2010]; pp. 1-91.
"Teach you how to enhance network"; Magazine of flexibly used PC network full of information about interests, work and so on; Jun. 10, 2009; Vol. No. 6, generic volume No. 147, Apr. 7, 1997; PC Japan.
Zheng, Shuo et al. IPTV Set Top Box Architecture and Function. Software Guide. Apr. 2008, vol. 7, No. 4.
International Search Report for PCT/CN2010/073584 dated Oct. 14, 2010.
"Merging of communication and broadcasting in the NGN age"; Practice Elementary Network, Internet protocol television; IPTV Standard textbook; Satoshi Miyachi; Oct. 20, 2008.

\* cited by examiner

US 9,084,027 B2

INTERNET PROTOCOL TELEVISION SYSTEM AND IMPLEMENTATION METHOD THEREOF

TECHNICAL FIELD

The present invention relates to application fields of the Internet Protocol Television (IPTV) and the wireless data card, and more especially, to an IPTV system and an implementation method thereof.

BACKGROUND OF THE RELATED ART

The IPTV system is a multimedia interactive system based on broadband technology, and it uses the broadband network technology to provide users with an interactive TV experience and multimedia service through multimedia network equipments.

The IPTV system is divided into four layers: an operation support layer, a service application layer, a bearer layer, and a user terminal. Wherein, the operation support layer and the service application layer provide the service management, the support and service applications to the IPTV system; the bearer layer is built mainly based on the broadband network, comprising the service layer, the convergence layer and the access layer. The service layer mainly implements specific service-related bearing and control. The convergence layer mainly implements the network bearing of each IPTV service between the specific service network to the user access. The access layer means the related network as well as equipment between the user set-top box and the service access control point (BRAS/AR (Access Router)), and mainly achieves the access of the IPTV service; the user terminal is the set-top box, and the IPTV user uses the set-top box to implement the IPTV service on a TV through a variety of broadband accesses provided by the operator.

The wireless data card is a wireless access product based on the 2G or 3G network. It uses the USB interface to be easily inserted into a computer having the USB port, and it integrates the functions of the modem and the mobile phone, and perfectly combines the mobile communications with the Internet; through the mobile network, the short message service and the data service can be achieved synchronously to enable users to get rid of the limitations of time and place, and the wireless communication is achieved anytime and anywhere.

The data service is one of the important functions of the wireless data card, it implements the broadband access of the user in the 3G network based on various network access ways of the wireless data card. The IPTV system and the wireless data card work together to achieve the wireless access of the access layer in the IPTV system. Replacing the wired broadband network access with the wireless broadband network access can achieve the mobility of the user terminal equipment in the IPTV system.

SUMMARY OF THE INVENTION

The technical problem to be solved in the present invention is to provide an IPTV system and an implementation method thereof to solve the problem of the defect in the prior art that a user equipment in the traditional IPTV system is not movable.

In order to solve the aforementioned problem, the present invention discloses a method for implementing an internet protocol television (IPTV) system, comprising:

installing a wireless data card in a television set-top box (STB) device through a personal computer (PC), establishing a connection with the STB device, and starting the wireless data card to wirelessly access to the IPTV network; and accessing to IPTV network resources through the PC or the STB device to achieve IPTV service.

In the aforementioned method, the step of installing the wireless data card comprises:

accessing to a daemon application server residing in the STB device through the PC, initiating a wireless data card installation command to the daemon application server, the STB device starting an installation procedure of the wireless data card according to the wireless data card installation command, and installing wireless data card WEB browser management software.

The step of starting the wireless data card to wirelessly access to the IPTV network comprises:

starting the wireless data card web browser management software through the PC, and controlling said wireless data card to wirelessly access to the IPTV network through the wireless data card web browser management software.

In the aforementioned method, the step of accessing to the IPTV network resource through the PC to achieve IPTV service comprises: an IPTV user accessing to a portal server in the IPTV system network through the PC in order to achieve the IPTV service.

In the aforementioned method, the step of accessing to the IPTV network resources through the STB device to achieve IPTV service comprises: the IPTV users accessing to an electronic program guide (EPG) server in the IPTV system network through the STB device to achieve the IPTV service.

The present invention also discloses an Internet protocol TV (IPTV) system, and the system comprises at least a personal computer (PC) and a TV set-top box (STB) device, the PC is set to: install a wireless data card in the STB device according to the user control, establish a connection with the STB device, and start the wireless data card to wirelessly access to the IPTV network; as well as access to the IPTV network resource to achieve the IPTV service according to the user control after the wireless data card wirelessly accesses to the IPTV network;

the STB devices is set to: after the wireless data card wirelessly accesses to the IPTV network, access to the IPTV network resource according to the user control to achieve the IPTV service.

In the aforementioned system, the PC is set to: initiate a wireless data card installation command to the STB device according to the user control;

the STB device is set to: receive the wireless data card installation command, and start the installation procedure of the wireless data card according to the wireless data card installation command, and install the wireless data card web browser management software.

The PC is set to: start the wireless data card web browser management software, and control the wireless data card to wirelessly access to the IPTV network through the wireless data card web browser management software.

In the aforementioned system, the PC is set to: access to the PORTAL server in the IPTV system network to achieve the IPTV service according to the user control.

In the aforementioned system, the STB device is set to: access to the electronic program guide (EPG) server in the IPTV system network to achieve the IPTV service according to the user control.

The technical solution of the present invention achieves the wireless of the IPTV user terminal device accessing to network so that the IPTV terminal device is movable in space, thus expanding the application scenarios of the IPTV system.

PREFERRED EMBODIMENTS OF THE PRESENT INVENTION

The main conceptive idea of the present invention is that the an IPTV user can let the Set Top Box (STB) device wirelessly access to the broadband network through a wireless data card, wherein, the user can use the PC to manage and control the wireless data card so that the STB device can access to the IPTV system network resource via the wireless data card, thus ultimately achieving the mobility of the user terminal equipment in the IPTV system.

The implementation of the technical solution will be described in further detail in combination with the accompanying drawings.

Figure 1:
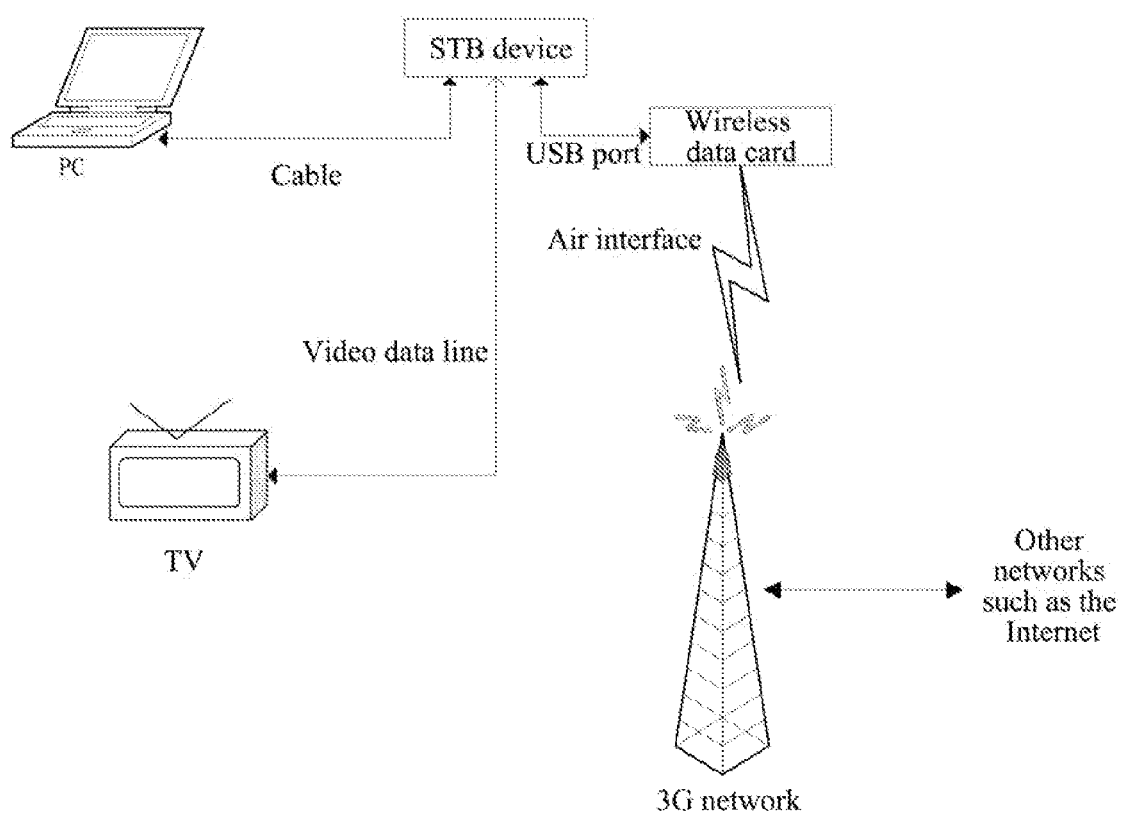
FIG. 1 is a diagram of an IPTV system architecture based on the wireless data card.

The architecture of an IPTV system based on the wireless data card is shown in FIG. 1, the IPTV system comprises: a personal computer (PC), a TV set-top box (STB) device, a television, and a wireless data card (Modem). The function of each part will be described in the following.

The TV is used to convert a WEB page of the STB device into a video signal to display to the user, so as to achieve the interaction between the user and the STB device;

the STB device is the IPTV user side and is used to receive the IPTV service, connect with the wireless data card via a USB port, and establish an IP connectivity with the PC, as well as install the wireless data card and install the wireless data card web browser management software etc. according to the PC control; and the STB device is used to access to the Electronic Program Guide (EPG) server in the IPTV network according to the user operation after it establishes a connection with the network, and receive a variety of request and response message from the IPTV network, and display the information through the TV to the user;

In this embodiment, the STB device is an embedded operating system, and there is a Daemon application server residing in the STB device, the PC initiates a wireless data card installation control command by accessing to the Daemon application server residing in the STB device, when the STB device receives the control command from the PC, its embedded operating system performs the installation and initialization of the wireless data card to install the wireless data card web browser management software.

The PC is used to interact and communicate with the wireless data card through the STB device, manage and control the wireless data cards, and access to the portal server in the IPTV system network through the wireless data card, receive various request and response message from the IPTV network, and display this information to the user through the PC;

wherein, the PC can access to the Daemon application service residing in the STB device to launch the installation control for the wireless data card, after the STB embedded operating system installs the wireless data card web browser management software, the PC interacts and communicates with the wireless data card through the wireless data card Web browser management software, as well as manages and controls the Modem.

The wireless data card is the media for the IPTV terminal device connecting to the IPTV network, and is used to achieve the wireless access of the STB device, and the mobile network is used to provide the users with the 3G broadband IPTV network service.

Figure 2:
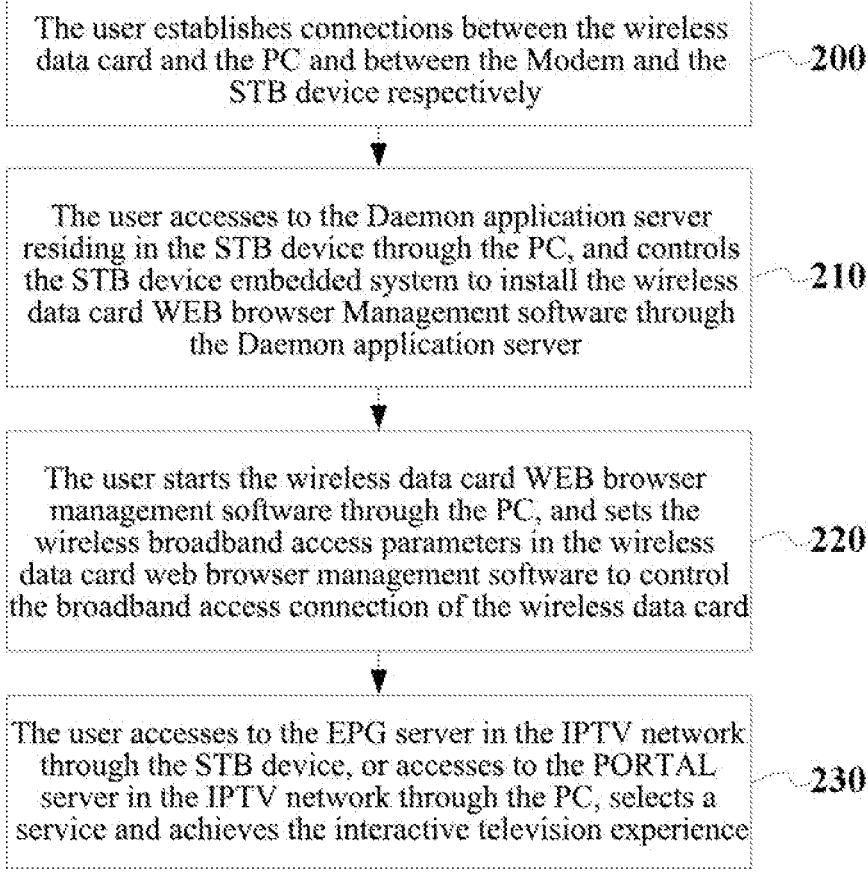
FIG. 2 is a flow chart of the IPTV system provided in the present invention implementing the IPTV service.

In the following, the specific process of the aforementioned system achieving the IPTV service will be described in detail, as shown in FIG. 2, it comprises the following steps:

step 200: the user establishes connections between wireless data card (Modem) and the PC and between the Modem and the STB device respectively, wherein, the user connects to the wireless data card through the USB port of the STB device;

step 210: the user accesses to the Daemon application server residing in the STB device through the PC, and controls the STB device embedded system to install the wireless data card WEB browser Management (also referred to as UI) software through the Daemon application server;

in this step, the PC controls the embedded operating system to install the wireless data card via the Daemon application Server.

Step 220: the user starts the wireless data card WEB browser management software through the PC, and sets the wireless broadband access parameters in the wireless data card web browser management software to control the broadband access connection of the wireless data card;

In this step, starting the broadband access connection of the wireless data card means that the STB device can access to the IPTV network through the wireless data card.

Figure 3:
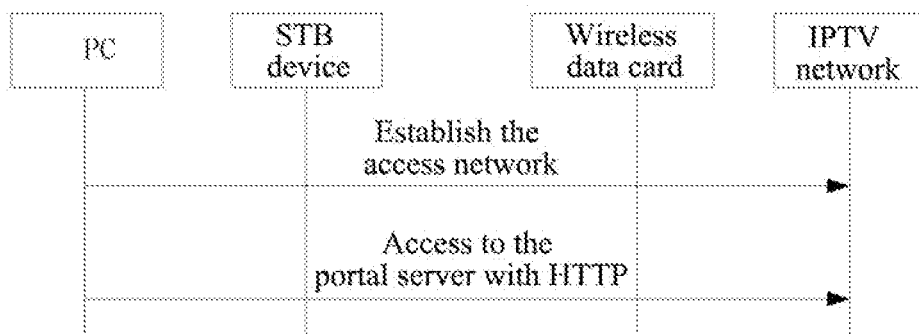
FIG. 3(a) is a flow chart of accessing to the IPTV network through the PC in the present invention.
FIG. 3(b) is a schematic diagram of the network architecture when the PC accesses to the IPTV network.
Figure 3:
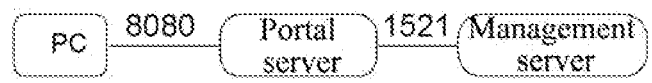
Figure 4:
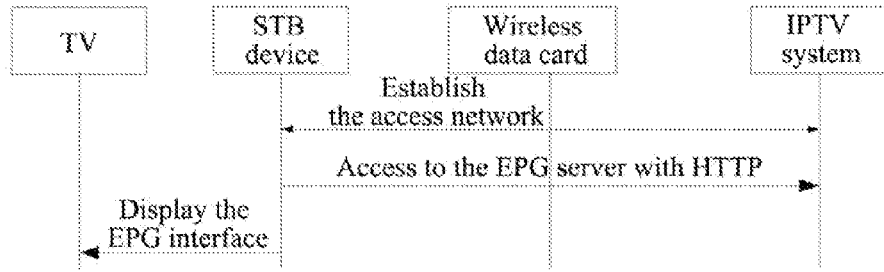
FIG. 4(a) is a flow chart of accessing to the IPTV network through the STB in the present invention.
FIG. 4(b) is a diagram of the network architecture when the STB accesses to the IPTV network.
Figure 4:
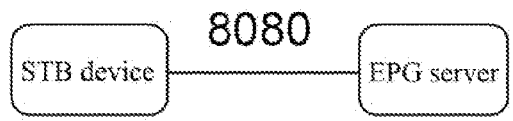

Step 230: the user accesses to the EPG server in the IPTV network through the STB device, or accesses to the PORTAL server in the IPTV network through the PC, selects a service and achieves the interactive television experience;

In this step, the specific process of the user accessing to the PORTAL server so as to access to the IPTV network through the PC is shown in FIG. 3(a), wherein, the PC accesses to the PORTAL server in the IPTV network through the port 8080, while the PORTAL server interacts with the MANAGER server in the IPTV network through the internal port 1521 based on the request of the PC to ultimately achieve the IPTV service, as shown in FIG. 3(b);

The specific process of accessing to the IPTV network through the TV and the STB device is shown in FIG. 4(a), in this way, on the basis that a network link is established between the STB device and the IPTV network through the data card, the user operates the STB device to access to the electronic program guide (EPG) WEB server through the IPTV remote control, and then the STB device converts the EPG page signal to A video signal to send to the TV, so that the user can carry out the IPTV interactive experience through the TV, wherein, the STB device accesses to the EPG server in the IPTV network through the port 8080, as shown in FIG. 4(b).

Figure 5:
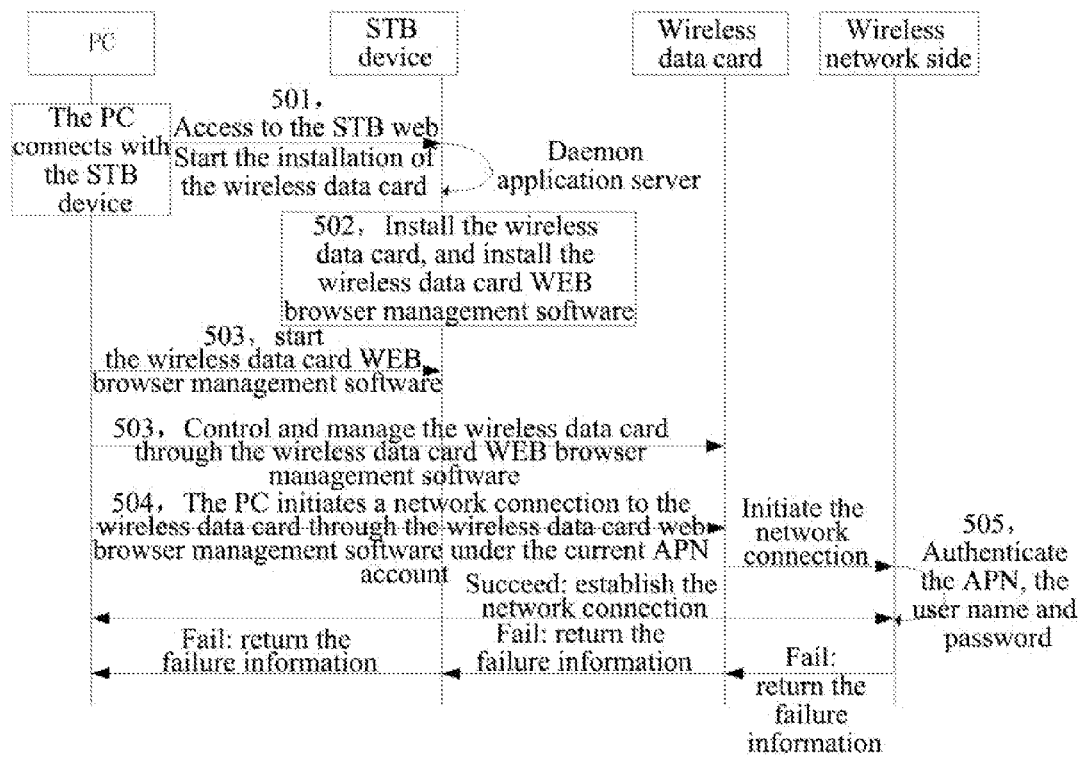
FIG. 5 is a flow chart of establishing a wireless data network connection in the technical solution of the present invention.

In the aforementioned process, the specific process of the user starting the broadband access connection of the wireless data card through the PC in steps 200~220, as shown in FIG. 5, comprises the following steps:

step 501: after the PC establishes a connection with the STB device, the user accesses to the Daemon application server in the STB device through the PC, and controls the STB device to install the wireless data card;

wherein, the Daemon application server which resides in the STB device embedded operating system works as the system application service and starts with the starting of the STB devices (that is, after the STB device starts, the Daemon application server starts instantly), after the Daemon application server starts, the service port of the STB device is monitored.

Step 502: the Daemon application server in the STB device receives the control command of the PC, installs the wireless data card, and installs the wireless data card WEB browser management software;

in this step, the PC accesses to the monitoring port of the Daemon application server through the Transmission Control Protocol/Internet Protocol (TCP/IP) network, if the Daemon application server receives the wireless data card installation command from the PC, it detects whether the wireless data card is installed or not, if the wireless data card is already installed, returns an installation complete prompt to the user equipment, otherwise starts to install the wireless data card and feeds the installation result back to the user;

Step 503: the user starts the wireless data card web browser management software through the PC, and controls and manages the wireless data card through the wireless data card WEB browser management software, wherein, the PC sets an APN parameter to manage the wireless data card accessing to the network, wherein, the APN parameter is the user account information used for network access, and the information is provided by the network operator to which the wireless data card registers, meanwhile the user identity authentication information is also provided.

In this step, after the PC receives the wireless data card installation success message returned by the Daemon application server in the STB device (that is, a communication link is established between the Modem and the STB), it sends a command for initiating the wireless data card Web browser management software. In this process, the driver procedures and driver installation tools needed by the Modem have been pre-installed in the specified directory in the embedded operating system, when installing the Modem, the installation command is initiated and the driver installation tools are started through the PC control, and the driver installation tools install the driver in the system driver according to the ID value of the Modem, therefore, the communication port between the Modem and the STB device is established.

Step 504: the PC initiates a network connection to the Modem through the wireless data card web browser management software under the current APN account;

Step 505: the network side first authenticates the user identity according to the APN and the user identity authentication information, if the authentication fails, the network side feeds back the failure information to the STB device, after the STB device receives the failure information, it notifies the information to the wireless data card WEB browser management software in the form of message, and then the wireless data card WEB browser management software displays the failure information to the user; if the authentication succeeds, the network connection is established successfully, that is, the access layer of the STB device is established.

It can be seen from the aforementioned embodiment that, the technical solution of the present invention achieves the wireless of the IPTV user terminal device accessing to the broadband network. Meanwhile, with the support of the faster and broader network in the 3G mobile communications network, people can enjoy the IPTV interactive experience anytime and anywhere.

The above description is only the specific preferred embodiments of the present invention better, however, the protection scope of the present invention is not limited to this, those skilled in the field can conceive changes and replacements within the technical scope disclosed in the present invention, these changes and replacements should be covered within the protection scope of the present invention. Therefore, the protection scope of the present invention should be based on the protection scope of the claims.

INDUSTRIAL APPLICABILITY

The technical solution of the present invention achieves the wireless of the IPTV user terminal device accessing to network so that the IPTV terminal device is movable in space, thus expanding the application scenarios of the IPTV system.

What is claimed is:

1. A method for implementing an Internet protocol television (IPTV) system, comprising:
    installing a wireless data card in a television set-top box (STB) device through a personal computer (PC), establishing a connection with the STB device, and starting the wireless data card to wirelessly access to an IPTV network; and
    accessing to IPTV network resources through the PC or the STB device to achieve an IPTV service;
    wherein the step of installing the wireless data card comprises:
    accessing to a daemon application server residing in the STB device through the PC, initiating a wireless data card installation command to the daemon application server;
    the STB device starting an installation procedure of the wireless data card according to the wireless data card installation command, and installing a wireless data card web browser management software.

2. The method of claim 1, wherein,
    the step of starting the wireless data card to wirelessly access to the IPTV network comprises:
    starting the wireless data card web browser management software through the PC, and controlling said wireless data card to wirelessly access to the IPTV network through the wireless data card web browser management software.

3. The method of claim 1, wherein,
    the step of accessing to the IPTV network resources through the PC to achieve the IPTV service comprises: an IPTV user accessing to a portal server in the IPTV system network through the PC to achieve the IPTV service.

4. The method of claim 1, wherein,
    the step of accessing to the IPTV network resources through the STB device to achieve the IPTV service comprises: an IPTV user accessing to an electronic program guide (EPG) server in the IPTV system network through the STB device to achieve the IPTV service.

5. An Internet protocol TV (IPTV) system, at least comprising a personal computer (PC) and a TV set-top box (STB) device, wherein
    the PC is set to: install a wireless data card in the STB device according to a user control, establish a connection with the STB device, and start the wireless data card to wirelessly access to an IPTV network; as well as access to IPTV network resources to achieve an IPTV service according to the user control after the wireless data card wirelessly accesses to the IPTV network;

the STB device is set to: after the wireless data card wirelessly accesses to the IPTV network, access to the IPTV network resource according to the user control to achieve the IPTV service;

wherein the PC is set to: initiate a wireless data card installation command to the STB device according to the user control;

the STB device is set to: receive the wireless data card installation command, and start an installation procedure of the wireless data card according to the wireless data card installation command, and install a wireless data card web browser management software.

6. The system of claim 5, wherein, the PC is set to: start the wireless data card web browser management software, and control the wireless data card to wirelessly access to the IPTV network through the wireless data card web browser management software.

7. The system of claim 5, wherein, the PC is set to: access to a PORTAL server in the IPTV system network to achieve the IPTV service according to the user control.

8. The system of claim 5, wherein, the STB device is set to: access to an electronic program guide (EPG) server in the IPTV system network to achieve the IPTV service according to the user control.

* * * * *